Aug. 1, 1950        F. C. LORNITZO        2,517,123

TRANSMUTABLE LEVER ACTUATED PRESSING MACHINE

Filed June 26, 1946        6 Sheets-Sheet 1

INVENTOR.
Frank C. Lornitzo
BY Thomas A. Jenckes
Attorney

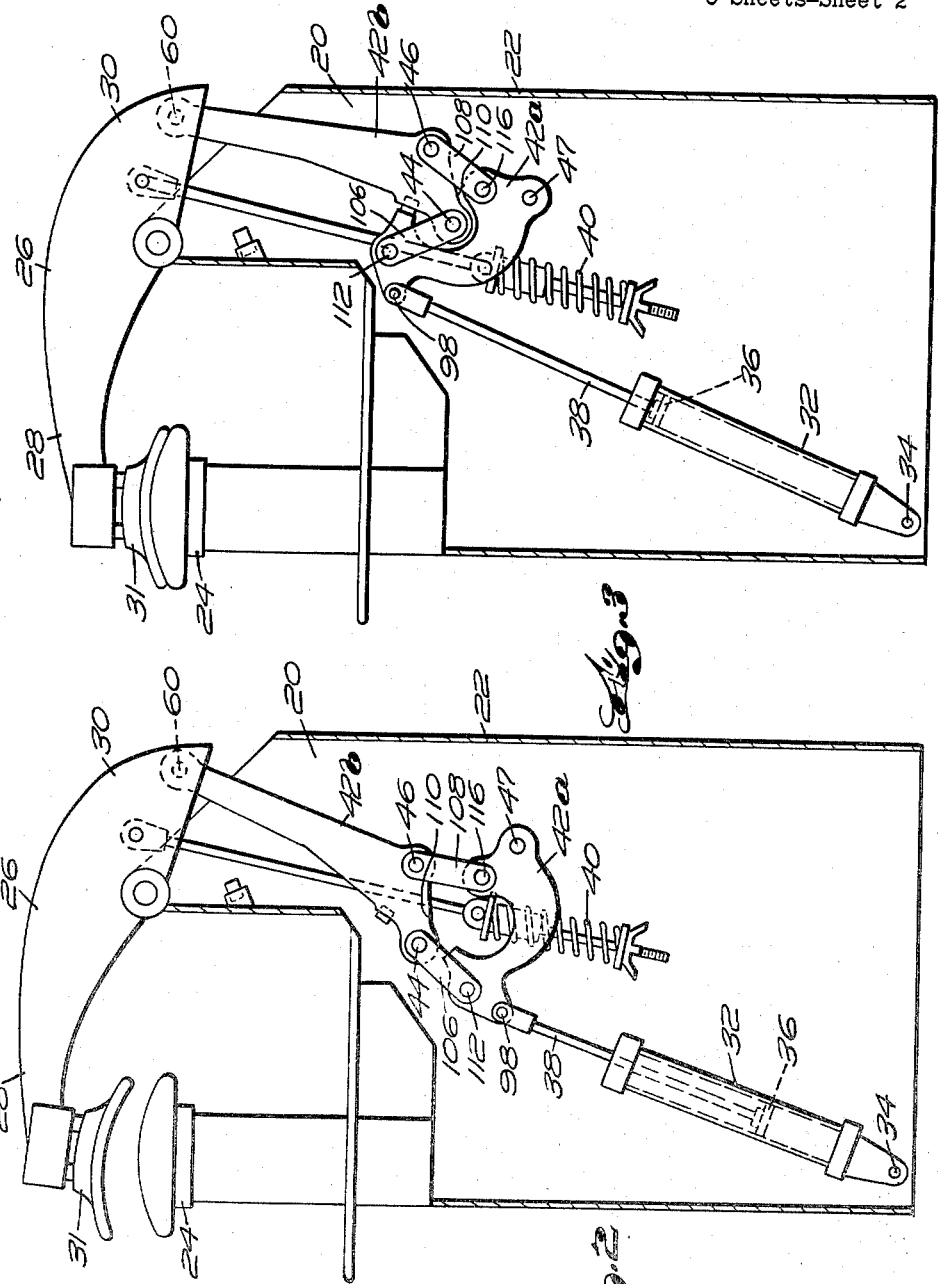

Aug. 1, 1950 F. C. LORNITZO 2,517,123
TRANSMUTABLE LEVER ACTUATED PRESSING MACHINE
Filed June 26, 1946 6 Sheets-Sheet 3

INVENTOR.
Frank C. Lornitzo
BY
Thomas A. Jenckes
Attorney

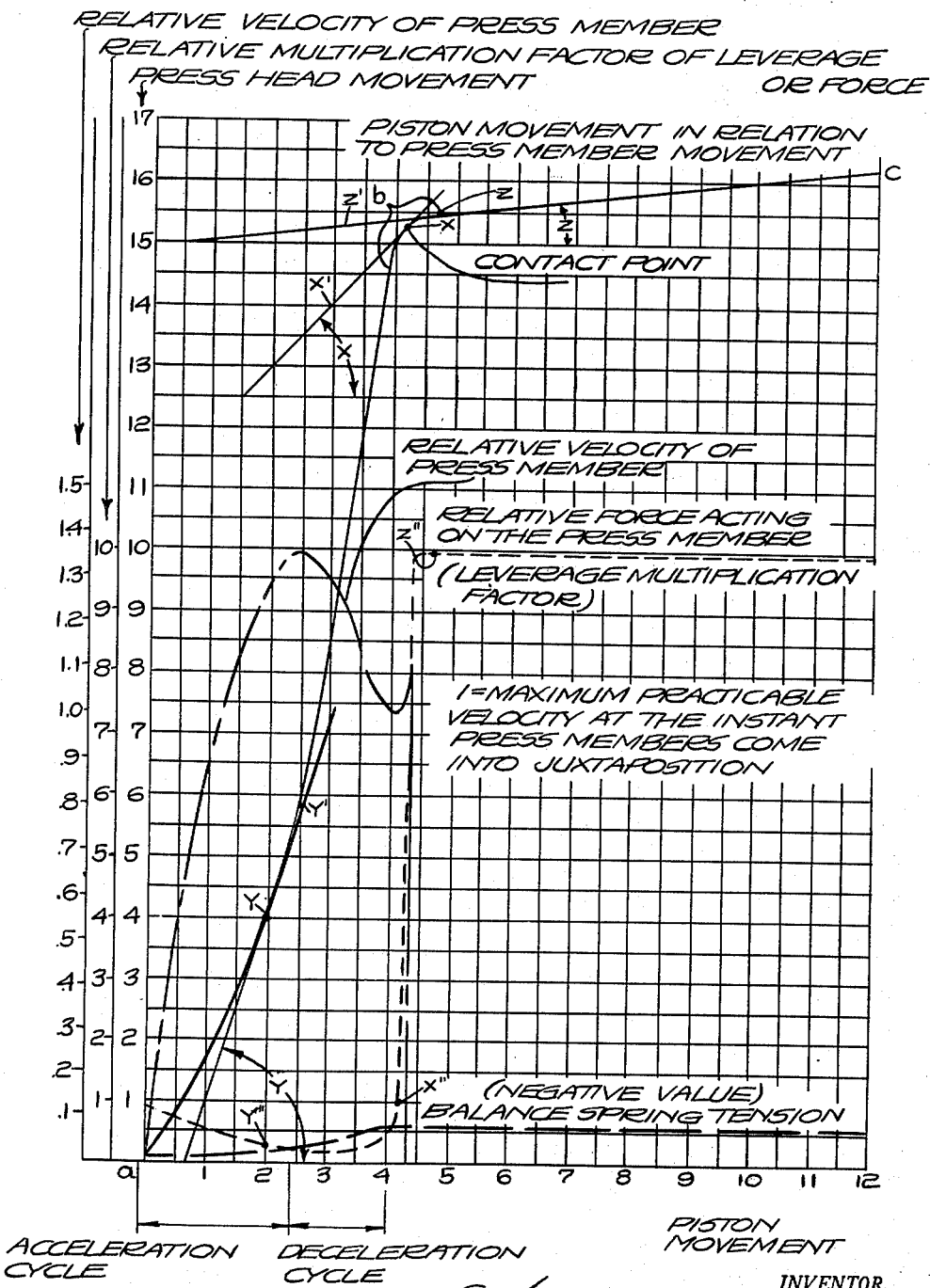

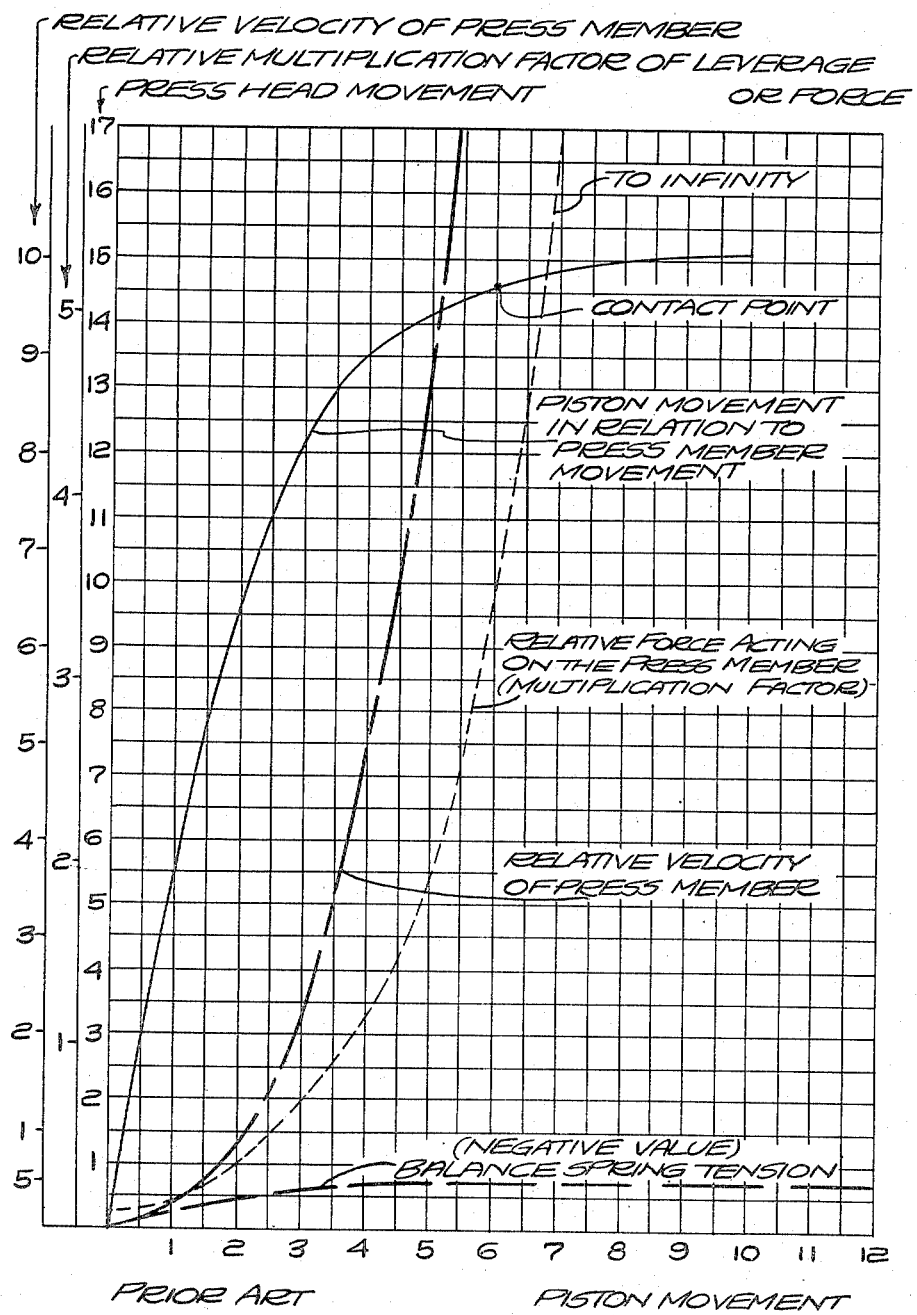

Patented Aug. 1, 1950

2,517,123

UNITED STATES PATENT OFFICE 2,517,123

TRANSMUTABLE LEVER ACTUATED PRESSING MACHINE

Frank C. Lornitzo, Pawtucket, R. I., assignor to Pantex Manufacturing Corporation, Central Falls, R. I., a corporation of Delaware Application June 26, 1946, Serial No. 679,498

4 Claims. (Cl. 38—41)

My invention relates to improvements in garment pressing machines and particularly mechanisms for transmitting and transforming force comprising levers and links for use in transmitting and transforming the input force applied thereto to the output force supplied thereby to the pressing head.

This application comprises the carrying forward of the broad subject matter of my prior application for patent for Pressing Machines and Linkage Mechanism for Transmitting and Transforming Force for Use Therein, Ser. No. 415,600, filed October 18, 1941, now Patent No. 2,451,844, and also embodies some of the subject matter of my joint patent application with Herbert G. Beede, for Pressing Machines and Multiple Lever Linkage Mechanism for Transforming Force for Use Therein, Ser. No. 415,778, filed October 20, 1941, now Patent No. 2,451,845.

This application comprises a simplification of the lever linkage structures shown in both applications to dispense with many of the parts formerly thought necessary and specifically is an improvement on the specific embodiment shown in Figs. 6–10 of said joint application No. 415,778 as explained later, although embodying all of the advantages and principles of the broad ideas shown in both said applications, and inasmuch as two levers, as well as two links are employed, combining the advantages and eliminating the disadvantages of the different specific embodiments shown in said applications, in the specific embodiment, a different lever being employed as the second power applying lever from that shown in the embodiment shown in said Figs. 6-10, namely the floating power applying lever comprising the triangular member comprising the upper toggle link. The power applying guide lever pivotally mounted on the frame, to which the piston is connected, as shown in Figs. 6–10 of said joint application, is so simplified, moved and differently connected as to eliminate the supplemental pivotally mounted lever and supplemental guide link shown in said embodiment.

It is apparent, therefore, that this application embodies the principles of a two lever system, so as to make each of the levers function nearer to right angles to each other to effect a greater leverage per unit material or cylinder volume than is possible with a single floating lever system.

A further advantage resides in the fact that each lever which functions as a power transmitting lever, also functions as a guide for the other and therefore eliminates the extra levers or links formerly thought necessary, with two links employed being transmutable from guide links to power transmitting links on respective changes of respective leverage characteristics as the effective leverage changes, so that the effective leverages exerted are substantially normal to each other.

A further advantage of the present system resides in the application of a differential leverage principle in which the differential is stronger in favor of one leverage during the closing stroke, the leverages are substantially balanced during the transmutation period and in favor of the other leverage during the pressing stroke.

While in the specific embodiments shown in said applications aforesaid, I have modified the action of the linkages shown therein to incorporate the velocity of movement of the pressing head to increase it during the closing stroke and to slow it down or brake it prior to its contact with the garment, in a specific embodiment shown herein I have not shown this feature, although if desired the linkage may be additionally modified to substantially achieve the velocity of movement curves illustrated in said applications, for in a new composite press designed by me, I have provided other means to automatically regulate the speed of movement of the pressing head during both the press closing and opening cycles and have eliminated the necessity of designing the linkage means to provide any braking action to maintain the press closing speeds within operating limits, as shown and described in my application, Power Actuated Opening and Closing Means for Garment Pressing Machines, Ser. No. 96,252, filed May 31, 1949.

Inasmuch, however, as this application involves the broad ideas shown and claimed in said applications aforesaid, with all the advantages thereof, at the risk of repetition, the advantages set forth in said applications are repeated here below.

I am aware that any number of combinations of levers and linkages have been used in the prior art, but so far as I am aware, these have been subject to the following disadvantages: Inasmuch as the piston moves outwardly in the cylinder to supply the power in a power press, exerting a substantially even force, if its force were transmitted directly to the pressing head, it is apparent the pressing head would move with even accelerated velocity up to the point of contact with the buck, the impact of the pressing members at this high velocity resulting in a sharp shock; inasmuch as in prior art linkage systems with single point connections the relative force acting on the pressing head would not only remain constant but would tend to increase during the closing movement of the pressing head, the impact of the pressing head would be even greater. To overcome the shock at the instant of contact of the pressing head with the pressing buck, various types of leverage mechanisms have been devised, and various types of braking mechanisms or cushioning devices to control the velocity, force and movement of the pressing head as it strikes the buck have been devised. These have tended to increase the time required for the pressing head in its downward movement to close the press, resulting in slowness of operation of the press during its closing period.

A further disadvantage of the prior art linkage systems with single point connections is due to the continuous change or increase of the relative force or multiplication factor of leverage of the linkage system during the pressing period resulting in unstable pressing conditions during the pressing period and making determination of the actual pressure at the end of the pressure stroke impossible and the actual pressure obtained dependent upon the compression qualities of the padded buck surface.

Another disadvantage of the prior art linkage systems with single point connections arising out of the instability of the power multiplication factor of the mechanism during the pressure stroke is the necessity for very frequent readjustments of the spacing between the pressing head and the buck to make up for the loss of thickness of the buck pad during its continuous use, resulting in loss of pressure unless frequent readjustments of the spacing between the pressing head and buck are made.

A further disadvantage of the prior art single point connection linkages resides in the fact that speed regulating mechanisms, such as dash pots, brakes, throttling of the fluid supply etc. must be employed to absorb the excessive power used in the press closing period, to prevent the pressing head from obtaining too high a velocity at the moment of contact to prevent harmful shocks to the mechanism and also to prevent disarrangement of the garment being ironed or pressed by the air current caused by the too rapid displacement of the air between the pressing head and the buck at the moment the pressing head moves into close proximity to the buck, the excessive power absorbed by the dash pots, brakes or overbalancing means representing waste of power.

Objects of my invention, therefore are to provide a mechanism for transmitting and transforming force, comprising levers and links so selected and adjusted as to overcome at least some of these objections to prior art structures and to supplementally provide a device which will function to fulfill all the requisites desired in a mechanism of this type.

A further object of my invention is to provide a device which will transform the input force into the necessary amount of output force desired for optimum operating conditions at various stages of the operation of the press to obtain maximum efficiency from the input force without the loss of any mechanical work lost in prior art structures by the various types of braking mechanisms formerly thought necessary. For this purpose I preferably employ a plurality of power applying lever means, one pivotable substantially entirely on a single closing movement fulcrum to function as a lever having one characteristic to apply a rapid movement and a small force to said pressing head and pivotable substantially entirely on another power applying fulcrum to function as a lever having different characteristics to apply a slow movement and a large force to said pressing head, during the outward stroke of said piston, and I employ rigid interconnecting and guide means, preferably comprising links, for automatically rapidly transmuting the leverage characteristics of said individual lever means for rapidly changing the respective power transmitting fulcrums of said respective lever means after a predetermined pivotable movement thereof, said link means also functioning as guide means and/or power transmitting means. An object of my invention employing such a structure is to provide one lever means with one characteristic effective to close the pressing head in the most efficient manner and with another characteristic effective to apply a constant pressing pressure for optimum efficiency during the pressing period, and a rapid fulcrum changing transmutation period during which the effective leverage characteristics are rapidly changed, and in the course of which said pressing head contacts said buck.

It is apparent that during the closing of the press, to avoid injury, it is desirable to apply as light a force as possible to the pressing head, and it is also apparent for the sake of efficiency that it is desirable to have the movement of the pressing head as rapid as possible during said closing period. As stated hitherto, it is also desirable that the relative velocity of the movement of the pressing head be as rapid as possible during as much of its closing period as possible, but that its relative velocity when it contacts the buck should be reduced to that at which it can safely contact the buck without disarrangement of the garment being pressed, and thus, through the medium of the selection of the leverage employed during the closing period and its method of connection and manner of being guided, I am able to achieve all these results in the closing period of the pressing head. By picking out an arrangement suitable for this purpose, it is possible if desired to control the velocity of the pressing head without the necessity of employing any braking means of the types formerly used, to impair the speed and efficiency of the linkage mechanism.

As stated, it is also desirable during the force applying period to have the pressing force applied to the garment being pressed as large as is consistently possible, but above all to secure an even pressing action for optimum pressing efficiency to have it constant during the pressing period. By the selection and arrangement of a leverage having a characteristic suitable to achieve these results during the pressing period, I am able to accomplish these desirable results.

As stated hitherto, it is desirable to close the press as rapidly as possible with as little force as possible and it is also desirable that the effective leverage characteristics acting upon the pressing head during the pressing period, namely the application of a greater pressing force, take effect as rapidly as possible once the head has contacted the buck. By providing a short transmutation period in changing from one effective leverage to the other, I am able to speed up the transition between these two periods without impairing the efficiency of the pressing operation during either period. As shown in the diagrams, and as will be apparent, in the parlance of motion pictures, during this transmutation period, the characteristics of the first leverage "fade out" and the characteristics of the second leverage "fade in." This result is highly desirable as it results, even during this extremely short transmutation period, in a rapid increase of force applied by the pressing head to cause it to immediately start to function in its pressing operation with desirable efficiency at the instant the head contacts the buck. It is also obvious that the press closes rapidly in a desirable manner almost to the moment it contacts the buck due to the rapidity of this short transmutation period, the transmutation of movement from fast to slow motion taking place rapidly during said period.

A further object of my invention is to provide a linkage system which will function in accordance with a predetermined force or multiplication factor of leverage curve and/or if desired a predetermined relative velocity curve. It is apparent that by providing a device which will function in accordance with these respective curves I am able to design a device which will function with optimum efficiency in accordance with a theoretical curve and actually construct a device in accordance with said curve and continuously reproduce identical devices. In the manufacture of the linkages the trial and error method is usually employed. When a trial device is assembled its respective curves may be plotted or otherwise constructed and corrected until the device functions in accordance with the desired theoretical curve.

As stated, I am able to achieve all these desirable results through the proper selection, connection and manipulation of two or more levers and suitable connecting links.

A further object of my invention is to employ only two rigid links as interconnecting means, and in order that such a smaller plurality of rigid links may be employed, I preferably employ links having transmutable functions functioning prior to the transmutation of leverage characteristics, and additionally functioning as power transmitting means and guides or fulcrums respectively before and after the transmutation of the leverage characteristics to maintain a near straight line movement when desired. It is apparent that by making the same links perform different functions during the actuation of the mechanism I am able to cut down the number of inherent parts necessary for the successful operation of my invention.

It is apparent that at least one of the levers or links, must be mounted on a fixed pivot, and a further object of my invention is to provide a device wherein the links and levers may be changed, as is necessary in employing a different type of head requiring less force in the pressing operation or a different size head and still have the system mounted on the fixed pivot.

A further object of my invention is that I am able to provide a device from which varying leverages may be successively obtained from a minimum number of parts easily assembled in a small compass to make them readily attachable on the relatively small space available on a garment pressing machine.

A further object of my invention is to provide a mechanism having low frictional loss.

A further object of my invention is to provide a device as will be apparent from the curve having an increasing movement during the pressing operation, as called in the trade a "follow up" motion, so that as the padding wears down in use it will still function with the same pressure without readjustment or replacement.

I am aware that somewhat analogous results have been provided in the prior art by the use of cam structures. As stated hitherto, my improved mechanism consists solely of power applying lever means and rigid links pivotally connected only at single points and controlled in their movement. It is apparent that the types of levers and links required are easier to make than to cut a suitable cam. It is also apparent that due to the fact that they are pivotally connected together by single point connections spread over a plurality of surfaces they wear less than a single cam and achieve an analogous purpose. It is also apparent that after a considerable amount of use and distributed wear, their force transforming and leverage characteristics are retained, whereas with all the wear on a single irregular cam surface they are not. It is also apparent that changes in effective transformation of force can be made by merely changing the points of connection of the levers and links without having to totally discard a member or any portion thereof, as is necessary in cams. It is also apparent that in employing simple levers and links it is possible to obtain a rapid transmutation period on devices which will function in the desired manner without excessive strain or wear thereon.

A further object of the embodiments of my invention shown herein is to eliminate the interconnecting links which function solely as guide links or alternate guide links and fulcrum providing means by making all links transmutable in this function from a fulcrum providing or guide link to a transmutable power transmitting link, making every link perform this function.

These and such other objects of my invention as may hereinafter appear will be best understood from a description of the embodiments thereof shown in the accompanying drawings.

In the drawings, Figs. 1–3 are side elevations partly in section of a garment pressing machine constructed in accordance with one embodiment of my invention, Fig. 1 showing the garment pressing machine in open position, Fig. 2 showing the garment pressing machine in the initiation of the transmutation period showing the pressing head about to contact the buck and Fig. 3 showing the pressing machine in pressing position.

Fig. 6 is a composite graph illustrating the motion curve in full lines, the force or multiplication factor of leverage curve in dotted lines, the relative velocity curve in dot-dash lines and the balance spring tension curve in dash lines produced by my invention.

Fig. 7 is a composite graph showing the motion curve in full lines, the force or multiplication factor of leverage curve in dotted lines, the relative velocity curve in dot-dash lines and the balance spring tension curve in dash lines of typical prior art transmitting and transforming linkage systems for the same purpose.

Figure 8:
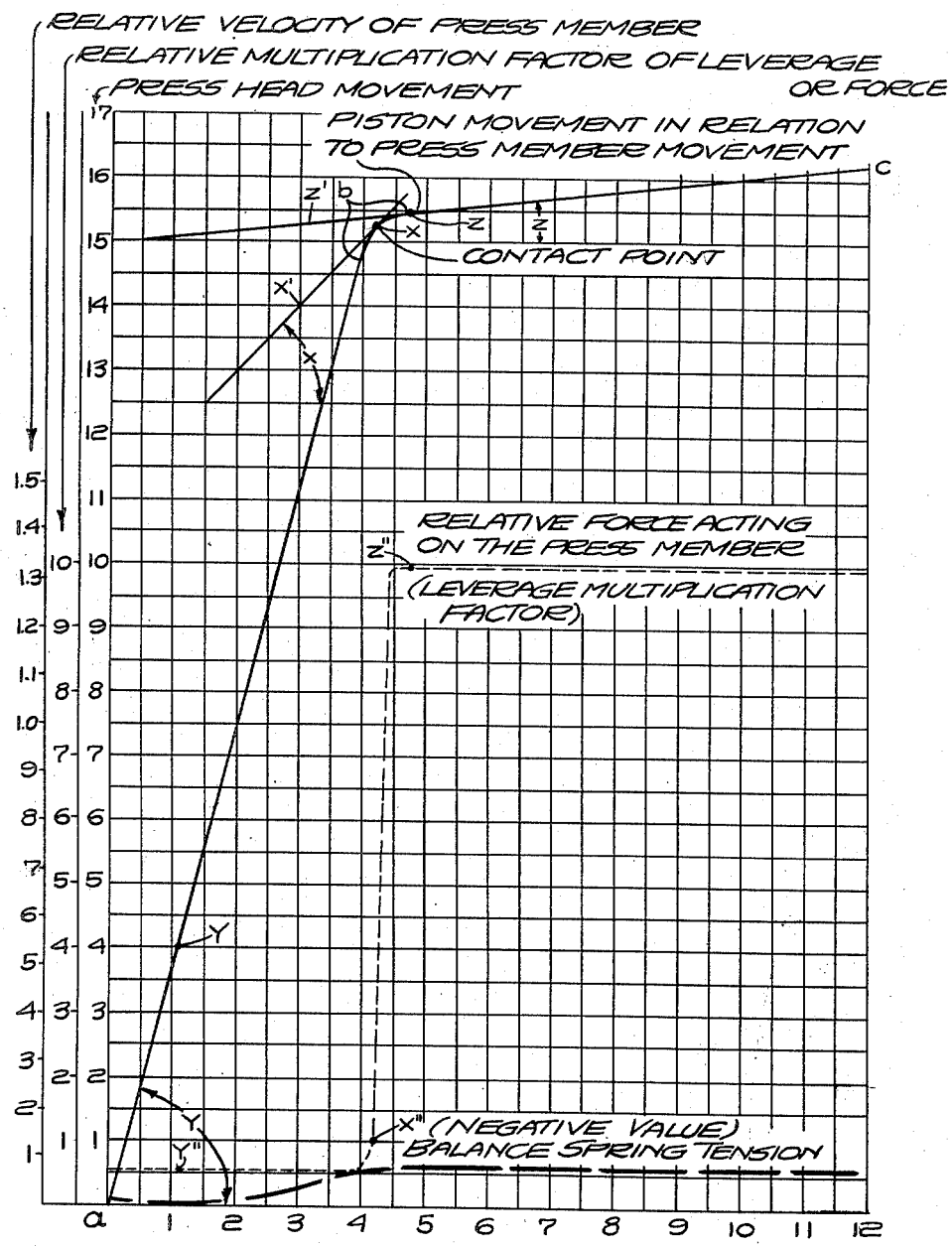

Fig. 8 is a composite graph similar to Figs. 6 and 7 of a slightly different embodiment of my invention, not designed to increase the velocity of movement of the pressing head or slow it up prior to contact with the buck and lever omitting the relative velocity curve, but showing the motion curve in full lines, the force or multiplication factor of leverage curve in dotted lines, and the balance spring tension curve in dash lines.

In the drawings, wherein like characters of reference generally indicate like parts throughout, 20 generally indicates a mechanism for transmitting and transforming force constructed in accordance with my invention. As stated hitherto, the specific type of such mechanism shown is particularly designed and adapted for use to solve the problems inherent in a garment pressing machine, said mechanisms being specifically designed to function in accordance with the curves shown in Fig. 8.

Figure 1:
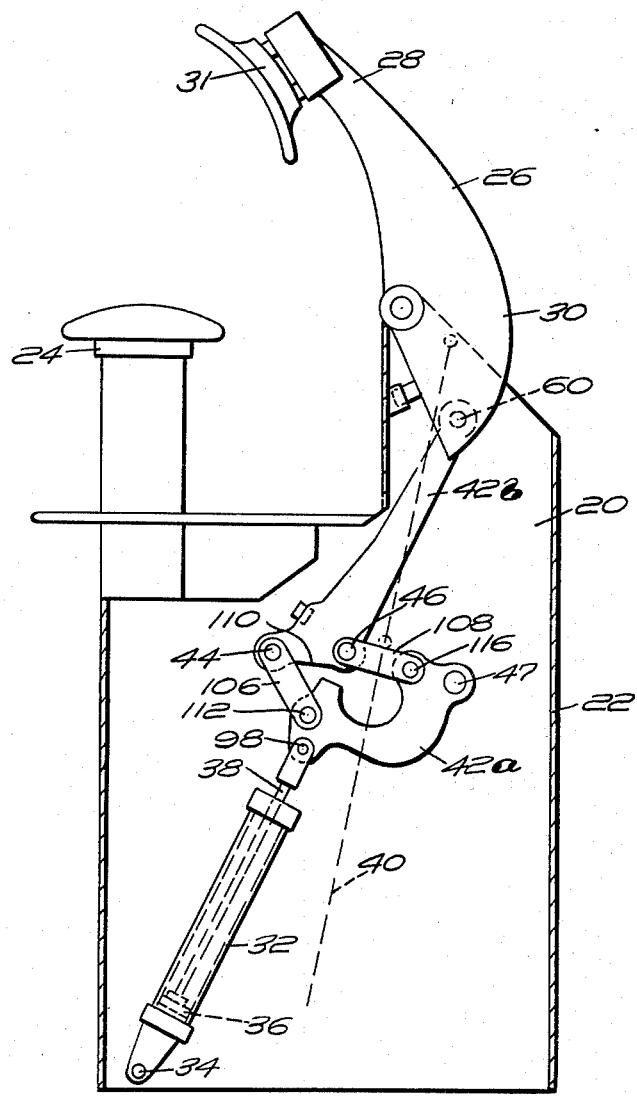

Any suitable type of a power driven garment pressing machine may be employed. As shown in the drawings, such a standard type of garment pressing machine includes a frame 22, a pressing buck 24 mounted on said frame, a pressing lever 26 pivotally mounted on said frame having a work arm 28 and a power arm 30 and a pressing head 31 mounted on said work arm to move to a closed position into pressing contact with said buck 24, as shown in Fig. 3, and to an open position away therefrom, as shown in Fig. 1. As the motive force for the power press, a suitable fluid motor is preferably employed comprising a cylinder 32 pivotally mounted as at 34 on the lower front end of said frame 22 having a piston 36 having a piston rod 38 projecting upwardly therefrom. Suitable means are provided to urge said pressing lever to an open position, in the embodiment shown, comprising the compression spring 40 suitably operatively connected to said power arm 30.

As stated hitherto, I employ mechanism 20 connecting said piston rod 38 and said pressing lever power arm 30, consisting solely of a plurality of power applying lever means, in the embodiment shown two, comprising the power applying and guide lever 42ª and the floating power applying lever 42ᵇ and rigid links 106 and 108 so pivotally interconnected by single point connections to said levers 42ª and 42ᵇ and controlled thereby in their movement to respectively transmit to said pressing head 31 the even force supplied by the even stroke of the piston 36 against the force of said urging means 40 while actuating said pressing lever 26, while transforming it into the following, as illustrated by the curves shown in Fig. 8, namely into (a) a relatively extremely light force applied to said pressing head 31 during its closing period and a relatively extremely heavy substantially constant force applied to said pressing head 31 during its pressing period after an extremely short intermediate rapid force increasing transmutation period, in the course of which said pressing head 31 contacts said buck 24, as illustrated by the curve shown in full lines in Fig. 6; (b) also transforming said even force to cause an extremely rapid relative movement of said pressing head 31 during its closing period and a relatively slow movement of said pressing head 31 during its pressing period after said extremely short intermediate transmutation period, as illustrated by the dotted line curve shown in Fig. 6; and (c) if desired as shown in Fig. 6, also transforming said even force to cause during said closing period an initial sharp increase in the relative velocity of movement of the pressing head 31 and a substantial drop in the relative velocity of said movement of the pressing head 31 to a velocity at which it can safely contact the buck 24 without disarrangement of the garment being pressed just prior to contact with the buck 24, as shown by the dash-dot line curve in Fig. 6. As will be apparent from said respective curves, the dotted line curve shown therein represents the ratio of force exerted by the piston to the force exerted by the pressing head, which, as shown by said dotted line curve varies in accordance with my invention in accordance with said curve in which the relative ratio of force exerted by the pressing head 31 to the force exerted by the piston 36 is less than 1 during the press closing period, increases multi-fold during an extremely short transmutation period in the course of which said pressing head 31 contacts said buck 24 and remains substantially constant at said high ratio during the pressing period. As also shown by the full line curve in Fig. 6, the ratio of piston movement varies in accordance with said curve wherein the relative ratio of the movement of the pressing head 31 to the movement of the piston 36 is substantially greater than 1 during the press closing period and after said extremely short transmutation period in the course of which said pressing head contacts said buck, remains substantially constant during the pressing period. As also shown by the dash-dot curve shown in Fig. 6, the ratio of the velocity of the pressing head movement also varies in accordance with said dotted line curve shown therein in the manner previously explained. I believe I am the first, therefore, to cause these respective ratios to vary during said respective periods for a linkage system employing two separate levers in accordance with predetermined designs or plotted theoretical curves.

It is a principle of the mechanics of leverage systems that the product of any movement and applied force is equal to the product of any other movement and applied force, in other words that at any instant the input force supplied to the piston times the movement of the piston equals the output force supplied by the pressing head times the movement of the pressing head. This relationship can be expressed by a graph if either the relative movements of the piston and the pressing head or relative forces applied by the piston and pressing head be plotted. Thus to get the corresponding movement or force at any one instant, it is merely necessary to draw the tangent to the movement curve at that particular point, and the cotangent of the angle formed by the extension of said tangent and the abscissa or any line parallel thereto or the angle of slope of the movement curve at said point represents and indicates the corresponding point in the force curve or vice versa, and thus having once plotted the relative movement or the relative force curve, the corresponding curve can be figured through the medium of respective cotangents. It is also apparent that once the relative multiplication factor of leverage or force curve is obtained, the relative velocity of press member curve may be readily obtained therefrom for any particular period by plotting the acceleration or de-acceleration of velocity of the press member at different successive periods as evidenced by the plotted force curve. Thus if either the movement curve, the force curve or the relative velocity curve can be theoretically predeterminedly designed or plotted or measured, the other corresponding curves may be readily figured therefrom. The movement curve may be readily obtained by moving the linkage mechanism a desired unit amount and actually measuring the relative input and output movements and plotting its respective point and repeatedly moving the linkage mechanisms additive amounts, preferably multiple amounts of the previous movement, and measuring and plotting those respective points until the desired movement curve as shown in Fig. 6 is made up. Assuming that the movement curve has been constructed or recorded in accordance with said method or otherwise, as shown in Fig. 6, if the tangent to said curve be drawn at any one point, such as the contact point $x$, as evidenced by the tangent $x'$, the co-tangent of the angle $x$ formed by the extension of said tangent and the abscissa or any line parallel to the abscissa will give the proper value from which the complementary point in the force curve may be plotted. Inasmuch as the angle at the point $x$ is 45°, it is apparent that its co-tangent will be $l$, namely the contact point $x''$ shown in the force curve. I have also illustrated in the drawings how the complementary point $y''$ in the force curve may be figured from the corresponding point $y$ in the movement curve. The tangent $y'$ to the movement curve at the point $y$ carried down to the abscissa produces the angle $y$ shown. The co-tangent of this angle is less than one-half as indicated by the complementary point $y''$ on the force curve. I have also illustrated in the drawings how the corresponding point $z''$ in the force curve may be figured from the corresponding point $z$ in the movement curve, in this instance being the point $z$ at the termination of the curve $b$ representing the short transmutation period. In this instance the tangent $z'$ to the movement curve at the point $z$ carried down to the abscissa produces the angle $z$ shown, and in the curve shown in Figs. 6 and 8, coincides with the relative straight oblique line of movement $bc$ of the movement curve shown in full lines. The co-tangent of the angle $z$ is substantially 10, as indicated by the corresponding point $z''$ on the force curve. Inasmuch as the angle $z$, therefore, remains constant for any point in the straight line $bc$, it is obvious that its corresponding point figured from its co-tangent will be in alignment with the corresponding point in the force curve figured from the co-tangent to form a straight line in the force curve as shown therein substantially beyond said point $z''$, graphically bringing out the fact that the pressing head acts with even force during the pressing period. By similarly plotting a sufficient number of points on the force curve, the force curve may be readily figured. Insofar as the relative velocity of the press member curve is concerned, it is obvious that if the force acting on the press member is maintained constant during the closing period, said velocity would increase in a substantially straight line extending upwards from zero at a slight angle as substantially a continuation of the straight line shown up to the unit 1. As shown by the force curve, however, the acceleration of force decreases substantially up to the contact point, causing the relative velocity curve to correspondingly decrease, as shown up to a point substantially midway where the force of the balance spring tension hereinafter described reduces the relative velocity of the press member so that it can safely contact the buck without disarrangement of the garment being pressed. If, however, either the relative velocity or the relative force curves are initially designed, figured or plotted first, it is aparent that the corresponding curve may be readily figured or plotted therefrom. For the curves shown in Figs. 6 and 8, in making up the movement curve, the same units of movement are applied for ordinates and abscissa; in making up the relative multiplication factor of leverage or force curve, the same units of force are applied for ordinates and abscissa. In making up the relative velocity of press member curve, however, the abscissa units represent fractions of the time interval of total piston travel, whereas the ordinate units comprise the maximum practical velocity of the pressing head the instant the press members come into juxtaposition taken as 1 (in this instance not corresponding to the regular ordinate divisional lines). For the curves shown in Fig. 7, however, in making up the movement curve, the same units of movement are also applied for ordinates and abscissa; in making up the relative multiplication factor of leverage curve, however, the ordinate units are exaggerated relative to the abscissa units to more accurately represent the curve and in making up the relative velocity of press member curve, the velocity unit scale for making up the ordinates thereof is reduced in length from the units shown in Fig. 6, still, however, employing the maximum practical velocity of the pressing head at the instant the press members come into juxtaposition as 1. Slightly different scales are employed in Fig. 5. I have shown in Fig. 7 what such respective curves were made by typical linkages employed for this purpose in the prior art without any braking mechanisms. As shown in full lines in Fig. 7, the movement curve also shown therein in full lines decreases rapidly up to the contact point, thereby increasing the time interval required for closing the press. As shown by the force curve or the multiplication factor of leverage curve also shown in dotted lines and by the relative velocity of the pressing head curve also shown in dash-dot lines, both the force and relative velocity of press members tend to increase to infinity. It therefore is absolutely essential to employ braking mechanisms on the prior art structures. For convenience I have also indicated the maximum practical velocity at the instant the press members come into juxtaposition, illustrating with what loss of efficiency said structures had to be braked. An inspection of the dotted line curve shown in Fig. 6, however, will demonstrate that the relative multiplication factor of leverage or force curve provided by my invention is very small right up to the contact point of the head with the buck, the condition desirable for safety during the press closing period, then increases rapidly during the transmutation period and then remains substantially constant during the pressing period for optimum even pressing during the pressing period. I have also shown in the drawings in dash lines the balance spring tension curve which is substantially the same in both the prior art devices and my invention. In Fig. 6, however, one factor is extremely interesting, namely that when the closing period nears its completion, the effective force of the pressing head becomes temporarily less than the tension of the balance spring so as to cause a positive slowing down of the relative velocity of the press member, as shown by the dot-dash line, to have it travel substantially at the instant the pressing head 31 contacts the buck 24 at a velocity insufficient to disarrange the garment being pressed.

As stated hitherto, my improved force transmitting and transforming mechanism 20, preferably includes the power applying lever 42a and 42b, the latter being pivotable substantially entirely on one lowering movement fulcrum 44, to apply a rapid movement and a small force to said pressing head during the closing period, and pivotable substantially entirely on another power applying fulcrum 46, to also apply a slow movement and a large force to said pressing head during the pressing period and rigid link means for automatically rapidly transmuting the leverage characteristics of said lever means by rapidly changing the effective respective power transmitting fulcrums 44 and 46, of said lever 42a, after a predetermined pivotable movement thereof to cause the rapid transmutation period during which the force applied to the pressing head increases rapidly as hitherto described. As shown by the curve in full lines in Figs. 5 and 8, the transmutation period comprises substantially the length of the sharply curved portion $b$, whereas the substantially straight line portion $ab$ of the curve in front of said transmutation period illustrates the movement during the closing period and the substantially straight line portion $bc$ of said curve after said curved portion $b$ illustrates the movement during the pressing period, the length of said sharply curved portion $b$ defining the transmutation period; in the other force and relative velocity curves shown in Fig. 6, it will be observed that the point $x$ marked "contact point" is made substantially half way of said curve, illustrating that the head contacts the buck in the latter half of this rapid transmutation period. Looking at the matter another way, during the closing period the power applying lever 42b, has one type of effective leverage characteristics and during the pressing period it has a different type of leverage characteristics substantially at right angles to the other, thus as shown in the transition of movement from the position shown in Fig. 1 to the position shown in Fig. 2, the effective leverage is largely horizontal, and after the transmutation period, the transition of movement from the position shown in Fig. 2 to the position shown in Fig. 3 is largely vertical or upward.

As will be apparent from my said application, where two separate levers are employed they may be so connected up in accordance with said invention to produce substantially identical curves as those shown therein. In the embodiment shown in this application, one power applying lever 42b, functions as a lever of a certain class having a certain type of lever characteristics to apply a rapid movement and a light force to said pressing head 31 while pivoting on a single effective closing movement fulcrum pin 44, and successively functions as a lever having an entirely different type of leverage characteristic, as a lever of a different class to apply a slow movement and a large force to said pressing head while pivoting on a single different power applying pressing movement fulcrum pin 46, during a single upward stroke of the piston 36.

A comparison of the present drawings with Figs. 6-10 of said joint application S. N. 415,778 shows that the present invention is specifically a modification and improvement of the embodiment of the invention shown in said Figs. 6-10. In this instance, however, the second power applying lever 42b' shown therein and its link 94' connecting it to the power applying and guide lever 42a are omitted, and the lever 56 shown therein becomes the second power applying lever 42b.

In the present case the cylinder 32 is mounted to project upwardly from the pivot point 34, so that the piston rod 38 thereof may be connected directly to the guide lever 42a at substantially the point 98 that the lever 94' was connected in said application, the pivot point 34 being somewhat lower for this purpose. The entire guide lever 42a is shifted somewhat to the rear of the machine and its pivot point 44' changed to the pivot point 47, substantially at the rear end of said lever. As in said embodiment, the power applying and guide lever 42a preferably extends forwardly and upwardly in an arc from its pivot 47, thus having its rear end pivotally mounted on the frame as at 47, and being pivotally connected to the piston 38 as at 98 at a point spaced from its pivot 47. In this embodiment the floating power applying lever 42b becomes the triangular member 56, comprising the upper toggle link shown in said application, having the apex thereof pivotally connected to a single point 60 on the power arm 30 of said pressing lever 26. In this instance, however, the power transmitting and guide link 106 is pivotally connected to a fixed point 112 on the front end of the guide lever 42a and to a fixed point 44 on the front end of the base of the triangular power applying lever 42b to function as a fulcrum 44 and it is effective to apply a rapid movement and a small force to said pressing head by pivoting said power applying lever 42b on its front end 44 as a fulcrum, although as previously explained, this embodiment functions even in greater degree than the embodiment shown in said Figs. 6-9 to maintain a straight line movement while the differential of leverages function in opposite directions and hence may not always pivot on the fulcrum 44 alone. The power transmitting and guide link 108, providing the lower toggle link, is pivotally connected to a fixed point 116 on the power applying and guide lever adjacent its frame pivot 47 and to a fixed point 46 on the rear end of the base of said triangular power applying lever 42b, functioning as the fulcrum 46, being effective to apply a slow movement and a large force to said pressing head by pivoting said power applying lever on its rear end 46 as a fulcrum to exert a leverage substantially normal to the leverage exerted when pivoted on its front end 44; although as previously stated, the lever 42b may function as a differential lever to maintain a straight line movement by occasionally changing its pivot points both during the lowering and power applying portions of the stroke of the pressing head.

It is apparent that this new embodiment of my broad invention functions much more simply than any of the embodiments shown in the prior applications, although in the action of the floating power applying lever 42b and the power transmitting links 106 and 108 it functions similarly to the embodiment shown in Figs. 6-10 of the joint application.

However, the present invention, as stated, eliminates the necessity for the extra pivotally mounted power applying lever 42b' shown therein and the link 94' by visualizing that the power applying and guide lever 42a by change of position could accomplish not only its function shown in said embodiment, but also the functions of the omitted elements 42b' and 94' by changing its position and pivot and preferably connecting it up to the piston 38 in a different manner. In this embodiment, power is applied to the front end of the guide lever 42a by the piston rod 38. This in turn raises the guide lever 42a from the position shown in Fig. 1 to the position shown in Fig. 2 to cause it to function to raise both links 106 and 108 simultaneously, causing the floating lever 42b to be lifted bodily upwards and backwards from the position shown in Fig. 1 to the position shown in Fig. 2, the net result being that it pivots on its front end 44 as a fulcrum to the position shown in Fig. 2 substantially closing the pressing lever 26, relatively lifting the rear end 46 of the base 110 of the triangular lever 42b for this purpose, and that then there occurs a transmutation period during which the actions of the respective power transmitting links 106 and 108 are somewhat merged into each other to cause a rapid force increasing transmutation period. As the front end of the guide lever 42a is urged further upwardly by the piston rod 38, it is obvious that it functions through the links 106 and 108 to move the floating lever 42b nearer to a vertical position moving its base 110 further rearwardly for this purpose and that as it moves further rearwardly, the outer front end of the lever 42a then functions through the medium of the link 106 to let the front end 44 of the lever 42b downwardly relative to its rear end 46 to permit a downward leverage on the floating lever 42b, substantially normal to the leverage exerted during the closing period (as shown by a comparison of Figs. 1 and 3), with an increased leverage, to cause the lever to pivot on its rear end 46 as a fulcrum as a lever of the first class as it is being lifted upwardly instead of as a lever of the third class as it functions during the closing period taking place in its movement between Fig. 1 and Fig. 2. During this period the link 108 functions as a fulcrum 46 and guide link and the link 106 functions as a power applying link, opposite to their respective actions during the closing period.

It is obvious that the effective leverage of the mechanism 20, may be readily changed by changing the sizes and shapes of the respective levers and links and their respective points of connection to the piston rod, pressing lever and to each other. The power applying levers and the respective guide, fulcrum providing and/or power transmitting links are so constructed and connected respectively to each other and to said pressing levers and piston rod, and the movement permitted by said levers and links is such that the device will cause the force transmitted by the piston rod to be transmitted and translated into force, and movement applied to the pressing head in accordance with the curves shown in Fig. 6. An inherent feature of my invention consists of the fact that all connections between the various members are pivot forming, single point connections only.

Figures 4, 5:
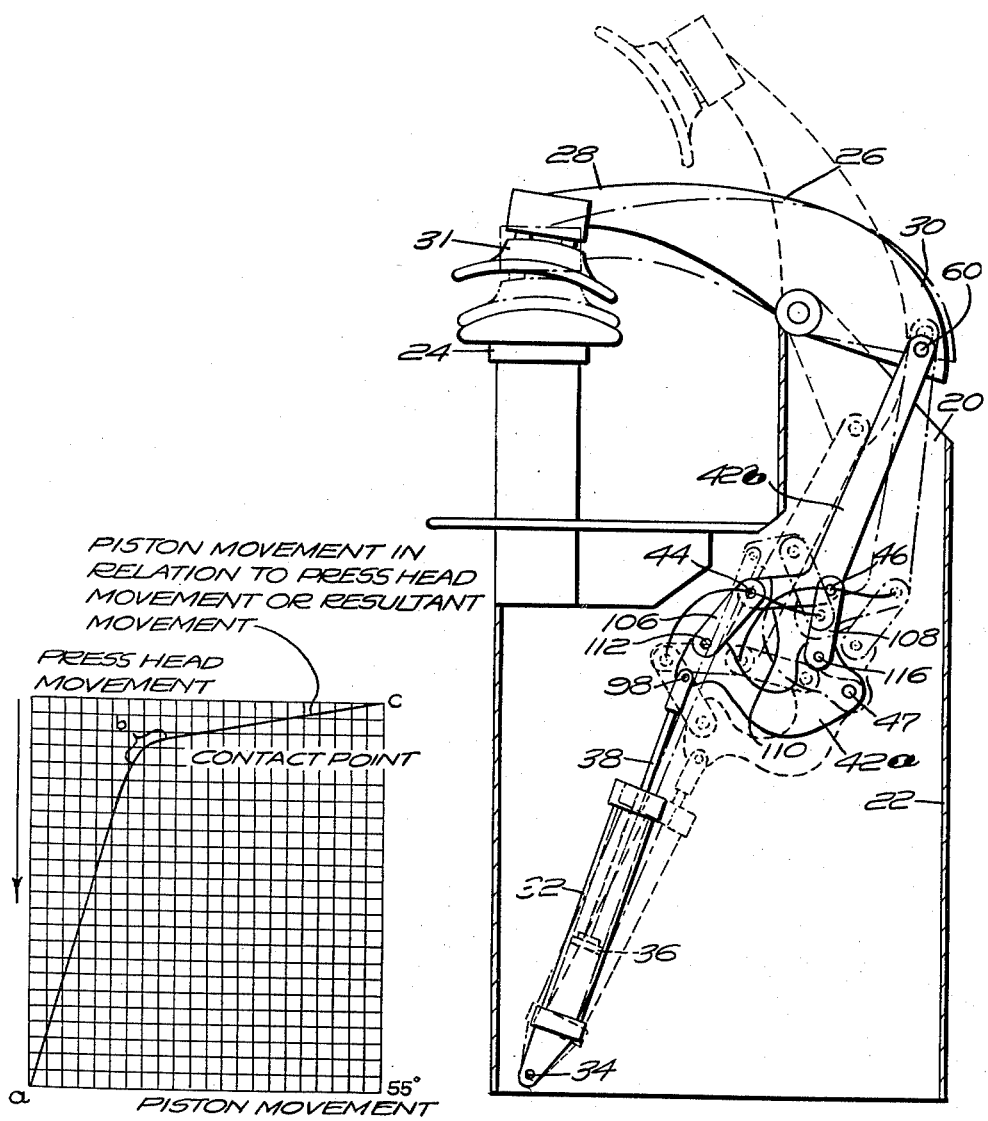
Fig. 4 is a diagrammatic view illustrating component parts of the press and linkage shown in Figs. 1–3 showing the press in open position in dotted lines, in the intermediate position in full lines and in closed position in dot-dash lines.
Fig. 5 illustrates a graph or chart showing the curve provided by the embodiment of my invention shown in Figs. 1–4 employing the amount of piston movement as abscissa and the amount of pressing head movement as ordinates of the type not correcting particularly for velocity of movement as shown in Fig. 8.

I have shown in Fig. 4, diagrammatic views illustrating the three positions of the respective different embodiments shown respectively in Figs. 1-3. In order that the transition of the transmutable functioning characteristics of the lever 42a, and the lever 42b and links 106 and 108 may be more readily understood, I have also shown in Fig. 5, the characteristic curve of a form of this embodiment, which differs slightly from the preferred curve shown in Fig. 6 which is a composite curve made up of the most desirable characteristics of all embodiments shown in all applications. One reason why these curves differ slightly from the different types of linkages employed is that in each instance it is desirable first to secure a straight line increment of movement supplied during the press closing period and a substantially constant increasing straight line increment of movement supplied during the pressing period for the reasons hitherto advanced. It is apparent from an inspection of Fig. 4, and the corresponding figures in said Lornitzo applications that all respective movements of controlling portions of the levers and linkages are curvilinear, and in order to obtain these straight line movements aforesaid, a curvilinear movement in one direction must generally be balanced by a curvilinear movement in the opposite direction, and these counterbalancing movements in order to obtain straight line increment portions in the respective curves must be counterbalanced, and it is apparent that the desired curve is obtained by a nice empirical balancing of the respective curvilinear movements of the respective elements in the different embodiments shown. It is apparent, however, from an inspection of Fig. 5 and the corresponding graphs in the Lornitzo applications aforesaid that all of these graphs or curves are substantially similar to the ideal graphs or curves shown in Fig. 6. At stated, the number, size, shape and location of the single point connections for the various levers and links shown in this application and in said application may be computed mathematically.

As stated hitherto and as claimed, the even force applied by the fluid cylinder may be transformed into an extremely light force applied to the pressing head during its closing period, and a relatively extremely heavy constant force applied to said pressing head during its pressing period after an extremely short intermediate rapid force increasingly effective leverage changing transmutation period during which said pressing head contacts said buck.

Alternately or cumulatively, the even force provided by the cylinder may be transformed to cause an extremely rapid relative movement of the pressing head during its closing period and a relatively slow movement of the pressing head during its pressing period after said extremely short intermediate effective fulcrum changing transmutation period.

Alternatively or cumulatively my invention may transform said even force applied by the fluid cylinder to cause during said closing period an initial sharp increase in the relative velocity of movement of the pressing head and a substantial drop in the relative velocity of said movement of the pressing head to a velocity at which it can safely contact the buck without disarrangement of the garment being pressed just prior to contact with the buck.

As previously stated, the effective leverage may be readily changed by changing the sizes and shapes of the levers or links and their respective points of connection to the piston rod, pressing lever and to each other to vary these functions. Thus, they may be connected to cause this desired change in velocity of movement during the closing stroke or any other change in velocity desired at the same time maintaining substantially the movement and force curves shown. I have shown in Fig. 8 my invention connected up so as to largely eliminate this desired change of velocity during the closing movement which results in a straighter line movement in the closing phase of the movement curve, as is apparent by a comparison of Figs. 6 and 3. As this gives a more unbalanced movement, it may be employed with former types of braking mechanisms as such mechanism is not designed to cause this braking action or may be modified by the mechanism shown and described in my application entitled, Single Unit Hydraulic Check for Checking Portions of the Opposite Strokes of a Member Moving in Opposite Directions, Ser. No. 96,646, filed June 2, 1949.

It is understood that my invention is not limited to the specific embodiment shown and that various deviations may be made therefrom without departing from the spirit and scope of the appended claims.

What I claim is:

1. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, a fluid cylinder for actuating said pressing lever having its lower end pivotally mounted near the front end of the base of the frame and a piston rod projecting upwardly therefrom, means urging said pressing lever to an open position, a floating power applying lever comprising a triangular member constituting the upper toggle link having the uppermost apex thereof pivotally connected to a single point on the power arm of said pressing lever, a power applying and guide lever having its rear end pivotally mounted on the frame and pivotally connected to said piston at a point spaced from its own pivot, a power transmitting and guide link pivotally connecting a point on the front end of said guide lever to a point on the front end of the base of said triangular power applying lever effective to apply a rapid movement and a small force to said pressing head and a power transmitting and guide link providing the lower toggle link pivotally connecting a point on said power applying and guide lever adjacent its frame pivot to a point on the rear end of the base of said triangular lever effective to apply a slow movement and a large force to said pressing head, the connections of said links to said levers being spaced to prevent crossing of said links during their operation, said levers and interconnecting link means transmitting to said pressing head the substantially even force supplied by said fluid cylinder against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing effective leverage changing transmutation period during which said pressing head contacts said buck; and also transforming said even force to cause an extremely rapid relative movement of said pressing head during its closing period and a relatively slow movement of said pressing head during its pressing period after said extremely short intermediate effective fulcrum changing transmutation period.

2. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, means urging said pressing lever to an open position, a floating power applying lever comprising a triangular member constituting the upper toggle link having the upper apex thereof pivotally connected to a single point on the power arm of said pressing lever, a power applying and guide lever having one end pivotally mounted on the frame, power applying means connected to said power applying and guide lever operable to urge the free end of said power applying and guide lever upwardly to pivot the pressing head downwardly, a power transmitting and guide link pivotally connecting a point on the free end of said guide lever to a point on an end of the base of said triangular power applying lever effective to apply a rapid movement and a small force to said pressing head by pivoting said power applying lever on one end and a power transmitting and guide link providing the lower toggle link pivotally connecting a point on the opposite end of said power applying and guide lever adjacent its pivot to a point on the opposite end of the base of said triangular lever effective to apply a slow movement and a large force to said pressing head by pivoting said power applying lever on its opposite end, the connections of said links to said levers being so spaced that said links will not become crossed in use, said levers and interconnecting link means being so constructed, connected and guided as to transmit to said pressing head the substantially even force supplied by said power applying means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing effective leverage changing transmutation period during which said pressing head contacts said buck; and also transforming said even force to cause an extremely rapid relative movement of said pressing head during its closing period and a relatively slow movement of said pressing head during its pressing period after said extremely short intermediate effective fulcrum changing transmutation period.

3. In a garment pressing machine, a frame, a pressing buck mounted on said frame, a pressing lever of the first class pivotally mounted on said frame and having a power arm, a pressing head mounted on said pressing lever to move to a closed position into pressing contact with said buck and to an open position away therefrom, a fluid cylinder for actuating said pressing lever having its lower end pivotally mounted adjacent the base of the frame and having a piston rod projecting upwardly therefrom, means urging said pressing lever to an open position and a floating linkage means between said piston rod and said power arm, said floating linkage means comprising an elongated triangular floating lever having its upper end pivoted to said power arm, a power applying lever having its lower rear end pivoted to said frame, the lower front end of said power applying lever being pivoted to the top of said piston rod, a front link having one end pivoted to the upper front end of said power applying lever and the other end pivoted to the lower front end of said floating lever, and a rear link having one end pivoted to the upper rear end of said power applying lever and the other end pivoted to the lower rear end of said floating lever, said front link pivoting about its lower pivot during the initial movement of said piston rod, whereby the initial movement of the piston rod will produce a direct and rapid movement of the power arm and pressing head and continued movement of said piston rod will cause said front link to pivot inwardly towards the lower rear pivot of the power applying lever to shift the transmission of power to the rear link and produce a slower movement and a constant heavy pressure of said pressing head.

4. In a garment pressing machine, a frame, a pressing buck mounted on said frame, a pressing lever of the first class pivotally mounted on said frame and having a power arm, a pressing head mounted on said pressing lever to move to a closed position into pressing contact with said buck and to an open position away therefrom, a fluid cylinder for actuating said pressing lever having its lower end pivotally mounted adjacent the base of the frame and having a piston rod projecting upwardly therefrom, means urging said pressing lever to an open position and a floating linkage means between said piston rod and said power arm, said floating linkage means comprising an elongated triangular floating lever having its upper end pivoted to said power arm, a generally U-shaped power applying lever having its lower rear end pivoted to said frame, the lower front end of said U-shaped power applying lever being pivoted to the top of said piston rod, a front link having one end pivoted to the upper front end of said U-shaped power applying lever and the other end pivoted to the lower front end of said floating lever, and a rear link having one end pivoted to the upper rear end of said U-shaped power applying lever and the other end pivoted to the lower rear end of said floating lever, said front link pivoting about its lower pivot during the initial movement of said piston rod, whereby the initial movement of the piston rod will produce a direct and rapid movement of the power arm and pressing head and continued movement of said piston rod will cause said front link to pivot inwardly towards the lower pivot of the power applying lever to shift the transmission of power to the rear link and produce a slower movement and a constant heavy pressure of said pressing head, the upper and lower pivots on said rear link and the lower rear pivot on said power applying lever constituting the toggle.

FRANK C. LORNITZO.

REFERENCES CITED

The following references are of record in the file of this patent:

UNITED STATES PATENTS

| Number | Name | Date |
|---|---|---|
| 1,070,680 | Glasgow et al. | Aug. 19, 1913 |
| 1,518,527 | Ledbetter | Dec. 9, 1924 |
| 1,680,729 | Davis | Aug. 14, 1928 |
| 1,747,879 | Pauly | Feb. 18, 1930 |
| 1,837,018 | Davis | Dec. 15, 1931 |
| 1,912,778 | LaBrie | June 6, 1933 |
| 2,051,739 | Page | Aug. 18, 1936 |
| 2,269,308 | Gates et al. | Jan. 6, 1942 |